US010675935B2

(12) United States Patent
Gross et al.

(10) Patent No.: US 10,675,935 B2
(45) Date of Patent: Jun. 9, 2020

(54) SUSPENSION SPRING UNIT FOR A VEHICLE CHASSIS

(71) Applicant: ThyssenKrupp Federn und Stabilisatoren GmbH, Hagen (DE)

(72) Inventors: Marcel Gross, Dortmund (DE); Dieter Lechner, Düsseldorf (DE); Gerhard Scharr, Elmenhorst (DE)

(73) Assignee: THYSSENKRUPP FEDERN UND STABILISATOREN GMBH, Hagen (DE)

( * ) Notice: Subject to any disclaimer, the term of this patent is extended or adjusted under 35 U.S.C. 154(b) by 0 days.

(21) Appl. No.: 15/120,702

(22) PCT Filed: Feb. 19, 2015

(86) PCT No.: PCT/EP2015/053536
§ 371 (c)(1),
(2) Date: Aug. 22, 2016

(87) PCT Pub. No.: WO2015/124693
PCT Pub. Date: Aug. 27, 2015

(65) Prior Publication Data
US 2017/0015170 A1    Jan. 19, 2017

(30) Foreign Application Priority Data
Feb. 24, 2014    (DE) .................. 10 2014 102 330

(51) Int. Cl.
*B60G 11/02* (2006.01)
*F16F 1/368* (2006.01)
(Continued)

(52) U.S. Cl.
CPC .............. *B60G 11/02* (2013.01); *F16F 1/366* (2013.01); *F16F 1/368* (2013.01); *F16F 1/3683* (2013.01);
(Continued)

(58) Field of Classification Search
CPC . F16F 1/366; F16F 1/027; F16F 1/376; B60G 2202/11
(Continued)

(56) References Cited

U.S. PATENT DOCUMENTS 1,641,059 A * 8/1927 Tausch ...................... F16F 1/32
267/162
1,772,414 A * 8/1930 Brooke-Hunt .......... F16F 1/371
267/141.1
(Continued)

FOREIGN PATENT DOCUMENTS

| CN | 2837127 Y | 11/2006 |
|---|---|---|
| DE | 3908474 A | 1/1990 |

(Continued)

OTHER PUBLICATIONS

International Search Report for PCT/EP2015/053536 dated Dec. 9, 2015 (dated Dec. 18, 2015).
(Continued)

*Primary Examiner* — Robert A. Siconolfi
*Assistant Examiner* — Mahbubur Rashid
(74) *Attorney, Agent, or Firm* — thyssenkrupp North America, LLC.

(57) ABSTRACT

A suspension spring unit can be positioned between a vehicle body and a wheel support. The suspension spring unit may form a constituent part of the vehicle chassis, configured with spring bodies made from a fiber composite material. At least two ring bodies arranged in series may be made from a fiber composite material and may have a respectively closed contour. The two ring bodies may be connected to one another via at least one connecting element.

20 Claims, 1 Drawing Sheet

(51) Int. Cl.
*F16F 3/087* (2006.01)
*F16F 3/02* (2006.01)
*F16F 1/366* (2006.01)

(52) U.S. Cl.
CPC .............. *F16F 3/02* (2013.01); *F16F 3/0876* (2013.01); *B60G 2202/11* (2013.01); *B60G 2206/428* (2013.01); *B60G 2206/7101* (2013.01); *F16F 2224/0241* (2013.01); *F16F 2238/022* (2013.01)

(58) Field of Classification Search
USPC ........................................................ 267/162
See application file for complete search history.

(56) References Cited

U.S. PATENT DOCUMENTS

| | | | | |
|---|---|---|---|---|
| 2,534,123 A * | 12/1950 | Hasselhorn | ............. | F16J 3/047 267/162 |
| 2,623,745 A * | 12/1952 | Premoli | ............. | B23Q 11/0825 160/202 |
| 2,716,011 A * | 8/1955 | Steimen | ............. | F16F 15/073 248/616 |
| 2,724,588 A * | 11/1955 | Sheets | ............. | F16F 1/373 267/141.1 |
| 2,939,663 A * | 6/1960 | Suozzo | ............. | F16F 1/13 |
| 3,224,344 A * | 12/1965 | Baumann | ............. | F16J 3/047 267/162 |
| 3,677,535 A * | 7/1972 | Beck | ............. | B60D 1/50 267/152 |
| 3,814,411 A * | 6/1974 | Aarons | ............. | B60D 1/50 267/152 |
| 3,879,025 A * | 4/1975 | Dillard | ............. | F16F 1/02 267/165 |
| 4,422,627 A * | 12/1983 | Schmidt | ............. | B29C 70/083 248/630 |
| 4,566,678 A * | 1/1986 | Anderson | ............. | B29C 67/0014 267/141.1 |
| 4,942,075 A * | 7/1990 | Hartel | ............. | F16F 1/366 248/632 |
| 4,962,916 A * | 10/1990 | Palinkas | ............. | B60G 15/068 267/153 |
| 5,169,110 A * | 12/1992 | Snaith | ............. | F16F 7/14 248/570 |
| 5,193,788 A * | 3/1993 | Richter | ............. | F16F 1/366 267/122 |
| 5,261,317 A * | 11/1993 | Fraser, Jr. | ............. | B29C 67/0014 267/141.1 |
| 5,280,890 A * | 1/1994 | Wydra | ............. | F16F 1/373 267/136 |
| 5,641,248 A * | 6/1997 | Arlt | ............. | E21B 19/006 166/350 |
| 5,868,384 A * | 2/1999 | Anderson | ............. | B61G 9/06 213/22 |
| 5,897,093 A * | 4/1999 | Le Derf | ............. | F16F 7/14 248/570 |
| 6,305,297 B1 * | 10/2001 | Landrot | ............. | B61F 5/302 105/157.1 |
| 6,345,814 B1 * | 2/2002 | Lawson | ............. | B60G 15/066 138/121 |
| 6,431,249 B1 * | 8/2002 | Tabellini | ............. | B23Q 11/0825 160/202 |
| 6,786,298 B1 * | 9/2004 | Chang | ............. | F16F 1/3735 181/207 |
| 7,134,648 B1 | 11/2006 | Rode | | |
| 7,249,756 B1 * | 7/2007 | Wilke | ............. | F16F 7/10 244/173.2 |
| 7,258,243 B2 * | 8/2007 | Ring | ............. | B61G 9/06 213/75 R |
| 7,461,815 B2 * | 12/2008 | Almeras | ............. | B64C 27/001 244/17.27 |
| 7,624,884 B2 * | 12/2009 | Palermo | ............. | B61G 9/06 213/22 |
| 8,146,898 B2 * | 4/2012 | Zabelka | ............. | F16F 1/3615 267/153 |
| 8,360,140 B2 * | 1/2013 | Zabelka | ............. | E21B 43/121 166/70 |
| 8,672,151 B2 * | 3/2014 | Sprainis | ............. | B61G 9/20 213/32 C |
| 9,133,899 B2 * | 9/2015 | Delage | ............. | F16F 1/13 |
| 2003/0164586 A1 * | 9/2003 | Michael | ............. | F16F 1/377 267/140.11 |
| 2007/0138720 A1 | 6/2007 | Evans | | |
| 2009/0200721 A1 | 8/2009 | Kobelev | | |
| 2011/0037210 A1 * | 2/2011 | Rode | ............. | F16F 1/32 267/162 |
| 2013/0313767 A1 * | 11/2013 | Lee | ............. | B60G 11/00 267/219 |

FOREIGN PATENT DOCUMENTS

| | | | |
|---|---|---|---|
| DE | 3931219 C | 8/1990 | |
| DE | 4017637 A | 12/1991 | |
| DE | 10146348 A1 | 5/2002 | |
| DE | 10141432 A1 | 3/2003 | |
| DE | 102005055050 A | 5/2007 | |
| DE | 102008006411 A1 | 7/2009 | |
| DE | 102009032919 A | 2/2011 | |
| DE | 102009029300 A | 4/2011 | |
| DE | 102013006981 A | 11/2013 | |
| EP | 0042068 A2 | 12/1981 | |
| EP | 0351738 A2 | 1/1990 | |
| EP | 0459220 A1 | 12/1991 | |
| EP | 2082903 A2 * | 7/2009 | ............. B60G 11/00 |
| FR | 710953 A * | 9/1931 | ............. B60G 11/02 |
| JP | S29-006259 A | 9/1954 | |
| JP | S47-014536 U | 10/1972 | |
| JP | S57-029834 A | 2/1982 | |
| JP | S57021847 U | 2/1982 | |
| JP | S58-016909 A | 1/1983 | |
| JP | H01-164613 A | 6/1989 | |
| JP | H2-046331 A | 2/1990 | |
| JP | H4-231741 A | 8/1992 | |
| JP | 2000088025 A | 3/2000 | |

OTHER PUBLICATIONS

English abstract of DE4017637A.
English machine translation of DE393129C.
Japanese Office Action issued in corresponding application No. JP2016-553544, dated Apr. 3, 2018.

* cited by examiner

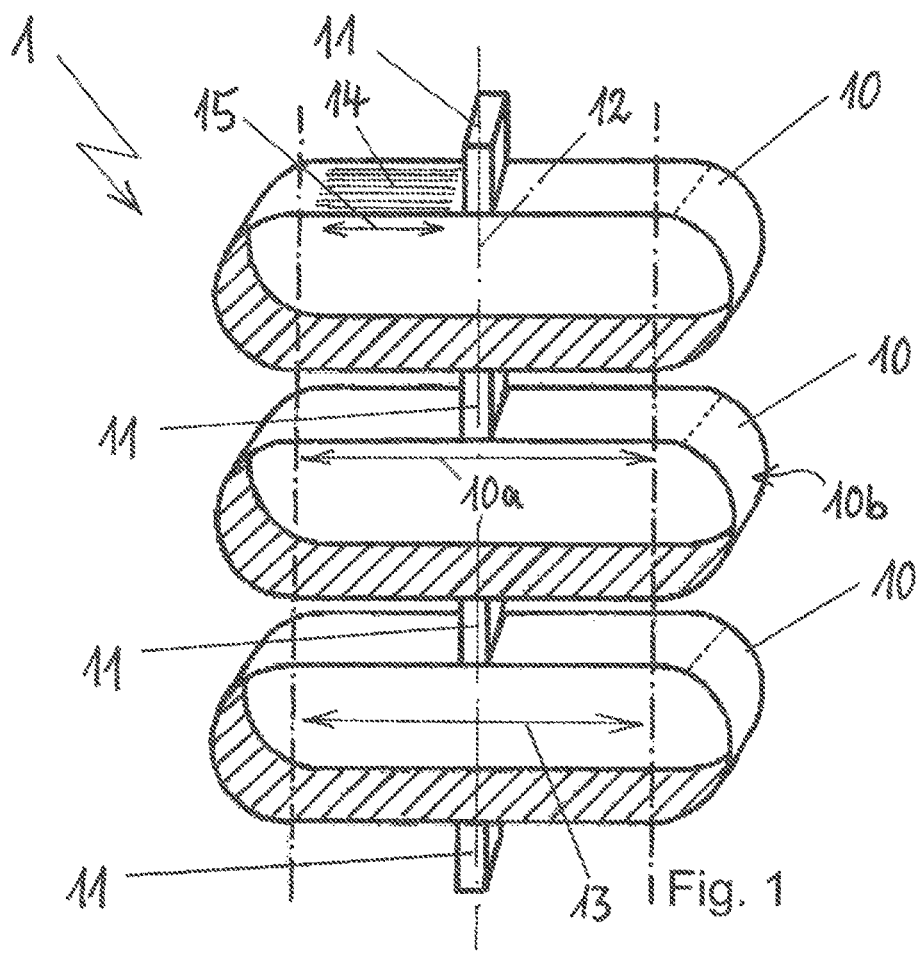
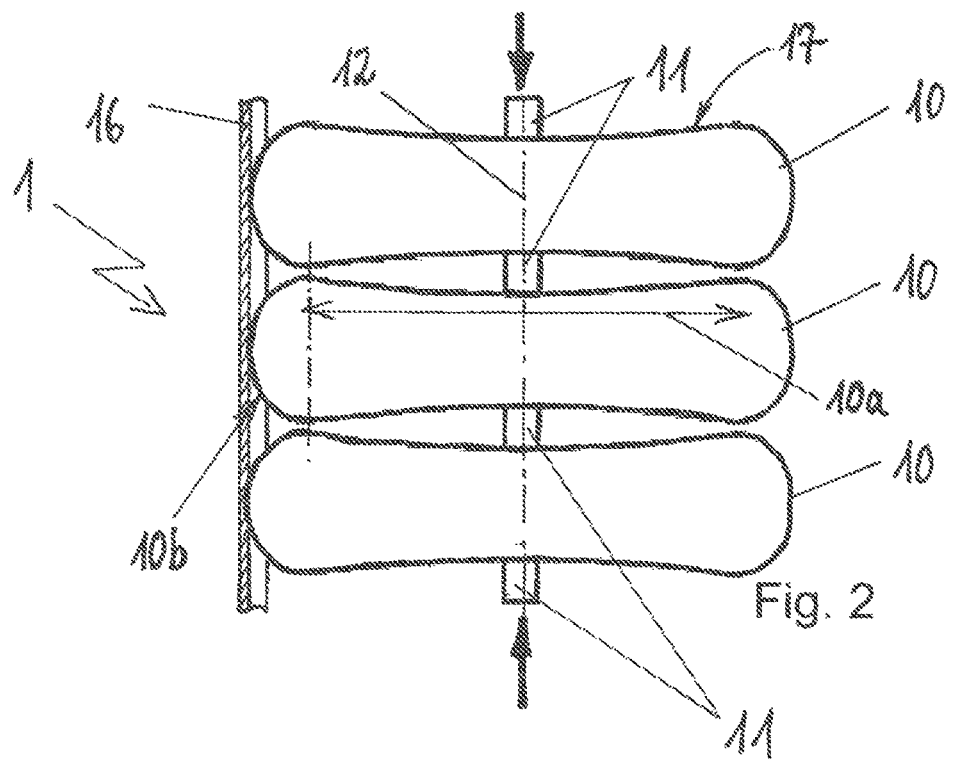

SUSPENSION SPRING UNIT FOR A VEHICLE CHASSIS

CROSS REFERENCE TO RELATED APPLICATIONS

This application is a U.S. National Stage Entry of International Patent Application Serial Number PCT/EP2015/053536, filed Feb. 19, 2015, which claims priority to German Patent Application No. 10 2014 102 330.7 filed Feb. 24, 2014, the entire contents of both of which are incorporated herein by reference.

FIELD

The present disclosure relates to suspension springs primarily for motor vehicles.

BACKGROUND

DE 101 41 432 A1 has disclosed a composite fiber spring which is constructed from two leaf springs made from a fiber composite material, and the leaf springs are connected to one another at their ends via connecting elements. The leaf springs are of rectangular configuration and comprise a curvature, and the leaf springs are connected via end edges to the connecting elements. Here, the concave surfaces of the leaf springs point toward one another, with the result that the two leaf springs together with the connecting elements form a shape in a similar manner to a closed oval. In order to introduce a force into the leaf springs, force introduction elements are applied on the leaf springs approximately centrally between the end edges of the leaf springs.

DE 10 2008 006 411 A1 discloses a further suspension spring unit for a vehicle chassis in the form of a flat spiral spring made from a fiber composite material with an undulating profile, the flat spiral spring being formed as a single wave train comprising reversal regions and intermediate sections, with the result that the flat spiral spring runs in a meandering manner. As a result of the single-piece production of the suspension spring unit from a single flat spiral spring, however, the construction of the suspension spring unit cannot be modified and is complicated to manufacture. For example, adaptations of the spring rate can be performed only by way of a replacement of the entire flat spiral spring as a result of the single-piece configuration of the flat spiral spring. In addition, the manufacturing of the flat spiral spring as a large, single-piece component is made more difficult, since the depositing of the fibers of the fiber composite material in a mold has to take place.

BRIEF DESCRIPTION OF THE FIGURES

FIG. 1 is a diagrammatic view of an example suspension spring unit that includes spring bodies made from fiber composite material.

FIG. 2 is a diagrammatic side view of the example suspension spring unit of FIG. 1 being loaded via outer connecting elements with a compressive force.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The present disclosure generally concerns suspension spring units for motor vehicles. In some examples, a suspension spring unit may be disposed between a vehicle body and a wheel support and may form a constituent part of the vehicle chassis, configured with spring bodies made from a fiber composite material.

An object of the invention is the development of a suspension spring unit for a vehicle chassis, which suspension spring unit is to be configured with spring bodies made from a fiber composite material; the suspension spring unit is to be simple to manufacture and of flexible construction; in particular, it is to be possible for the spring properties of the suspension spring unit to be adapted to corresponding requirements by way of simple means.

This object is achieved proceeding from a suspension spring unit for a vehicle chassis having spring bodies made from a fiber composite material in accordance with the preamble of claim 1 in conjunction with the characterizing features. Advantageous developments of the invention are specified in the dependent claims.

The invention includes the technical teaching that at least two annular springs which are arranged in series, are made from a fiber composite material and have a respectively closed contour are provided, which are connected to one another via at least one connecting element.

According to the invention, in order to form the suspension spring unit, the spring bodies made from a fiber composite material are formed by way of ring bodies which comprise a closed contour. Here, the ring bodies are connected to one another via connecting elements, in particular via their ring outer sides, and at least two and, in particular, a plurality of ring bodies can be connected in series to one another, in order to form the suspension spring unit for a vehicle chassis. Here, the ring bodies are coupled to one another centrally via the connecting elements, and the connecting elements serve for the transmission of force, with the result that the ring bodies and the connecting elements in each case transmit the same force as a result of the series connection, for example between the wheel support and the vehicle body.

At least two connecting elements can advantageously be arranged diametrically opposite one another on the ring bodies, with the result that a spring direction which runs through the connecting elements is defined. Here, the ring bodies can be of oval configuration and/or it can be provided that the ring bodies are of elongate configuration in a transverse direction which runs transversely with respect to the spring direction. This results in individual ring bodies which comprise the shape of a ring which is flattened on two sides or an oval. Here, the individual ring bodies can all comprise the same or different spring characteristics. When the suspension spring unit is loaded, the individual ring bodies are pressed together and the overall spring travel of the suspension spring unit is composed of the respective spring travels of the individual ring bodies. The individual ring bodies which lie above one another and are connected by way of the connecting elements can all be arranged, with regard to their extent in the transverse direction, in parallel, but also rotated with respect to one another at different angles about the common spring direction.

The individual ring bodies can be manufactured inexpensively in simple winding processes, and it is particularly advantageous if the fiber composite material comprises fiber layers which run at least predominantly and preferably completely in the circumferential direction of the ring bodies. This results in particularly simple manufacturing of the ring bodies by way of a winding process. In order to produce a cross-sectional strength in the lateral direction with respect to the circumferential direction, the ring body can comprise at least one braided layer, and the winding fibers and the braided layer can be introduced into a matrix, for example made from an epoxy resin.

In particular, the configuration as oval ring bodies with a transverse direction which forms the longer axis of the oval, extends in the elongate axis of the oval ring bodies and runs transversely with respect to the spring direction, the ring bodies can be manufactured in a simple way. Here, however, the ring bodies can also be configured in an annular manner, oval manner, that is to say with a variable curvature over the entire circumference, or as elongate rings, with the result that the closed contour of the ring bodies is formed by way of two substantially straight main sections which run approximately parallel to one another in the transverse direction and two radius sections which connect the main sections. The main sections of the ring bodies which run parallel to one another result, for example, in a lower overall height of the suspension spring unit, consisting of a plurality of ring bodies. The connecting elements can connect the ring bodies to the main sections, with the result that the connecting elements are attached to the ring bodies, for example, centrally on the main sections.

The fiber composite material can comprise, for example, a glass fiber material or a carbon fiber material, and, for example, a resin, in particular an epoxy resin, can be used as matrix.

The ratio of the length of the axis in the transverse direction to a length of an axis of the ring bodies which runs in the spring direction can correspond to a value of from 2:1 to 10:1 and preferably of from 3:1 to 5:1. The greater the ratio, the wider the overall design of the suspension spring unit, ring bodies with an oval cross section and a large main axis generally bringing about a lower spring rate than a height which tends to be short, since the resilience of the individual ring bodies in the vertical direction is greater.

According to a further advantageous embodiment of the suspension spring unit according to the invention, at least one guide element can be provided which guides the ring bodies and prevents buckling of the ring bodies out of the spring direction. Here, the individual ring bodies can slide in the guide element during a compression, in order to ensure the mobility of the ring bodies with respect to the guide element which, for example, is arranged rigidly. For example, two guide elements can also enclose the ring bodies in a manner in which they lie opposite one another, and, for example, the ring bodies can be guided via their radius sections in at least one guide element. It is also conceivable that the guide element or elements forms/form a housing which protects the ring bodies against moisture and contaminants.

The ring bodies can comprise a circumferential cross section of flat configuration in the manner of a flat belt. Here, the at least one connecting element can be connected to the circumferential cross section in such a way that the flat belt runs with an unchanged cross-sectional profile through the connecting point to the connecting element. This results in advantageous loading of the ring bodies. The circumferential cross section can particularly advantageously be of unchanged, that is to say constant, configuration over the entire circumference of the ring bodies.

The suspension spring unit according to the invention can be of particularly light configuration as a result of the configuration of spring bodies made from a fiber composite material in the shape of ring bodies with a closed contour, it being possible for the suspension spring unit to comprise identical or similar spring properties to a steel spring which is used as a suspension spring in the chassis of a vehicle. Here, the suspension spring unit comprises an extremely low weight, and the performance of the suspension spring unit having the features of the present invention can be sufficient, depending on the dimensioning of the ring bodies, to be used as a chassis spring of a vehicle. For example, a plurality of connecting elements can also be provided between two ring bodies which are connected to the flat belt of the ring body in a manner which is spaced apart from one another, for example in order to distribute an introduction of load into the ring bodies in an improved manner.

FIG. 1 shows a suspension spring unit 1 in a diagrammatic view with perspectively shown ring bodies 10 which are manufactured from a fiber composite material and form spring bodies of the suspension spring unit 1. The suspension spring unit 1 can serve in a way which is not shown in greater detail for a vehicle chassis of a vehicle, and the suspension spring unit 1 can be arranged, for example, between a vehicle body and a wheel support, and thus can form a constituent part of a vehicle chassis.

By way of example, the suspension spring unit 1 comprises three ring bodies 10 which are connected to one another by way of connecting elements 11. In order to also connect the suspension spring unit 1 to the vehicle body and the wheel support, the upper ring body 10 and the lower ring body 10 in each case comprise further connecting elements 11 on the outer side.

The connecting elements 11 are arranged on the ring bodies 10 diametrically opposite one another, with the result that a spring direction 12 which runs through the connecting elements 11 is defined. If the suspension spring unit 1 is loaded compressively via the outer connecting elements 11, the ring bodies 10 compress in the spring direction 12, with the result that the length of the suspension spring unit 1 is shortened correspondingly.

The ring bodies 10 are configured with a closed, constant contour, and the ring bodies 10 comprise a flat belt with a constant circumferential cross section. The ring bodies 10 are manufactured from a fiber composite material and comprise fiber layers 14, as shown by way of example on the upper ring body 10. The fiber layers 14 run in the circumferential direction 15, and the circumferential direction 15 defines the circulating direction of the ring bodies 10. An advantageous load case with regard to the loading of the ring bodies 10 is produced by way of the profile of at least one predominant part of the fiber layers 14 in the circumferential direction 15, since the ring bodies 10 are loaded only transversely with respect to the circumferential direction 15, with the result that the fibers of the fiber layers 14 can correspondingly absorb the loading, and the ring bodies 10 are loaded in the longitudinal direction of the fibers of the fiber layer 14.

The three ring bodies 10 which are shown by way of example are of geometrically identical configuration, but the ring bodies 10 can also comprise different configurations and can be connected to one another by way of the connecting elements 11. When the suspension spring unit 1 compresses, the spring travels of the individual ring bodies 10 are added to form an overall spring travel, it also not being absolutely necessary for the stiffness of the individual ring bodies 10 to be identical, and it being possible for the ring bodies 10 to comprise different spring rates.

The exemplary embodiment shows a suspension spring unit 1 having ring bodies 10 of oval configuration, and the ring bodies 10 have a transverse direction 13 which runs transversely with respect to the spring direction 10, shown by way of example on the lower ring body 10. The ring bodies 10 therefore comprise a greater extent which runs in the transverse direction than the height of the ring bodies 10 in the spring direction 12.

The ring bodies 10 which are shown by way of example are configured as flattened rings, and the closed contour of the ring bodies 10 is formed by way of two substantially straight main sections 10a which run approximately parallel to one another in the transverse direction 13 and in two radius sections 10b which connect the main sections 10a.

FIG. 2 shows a diagrammatic side view of the suspension spring unit 1 according to FIG. 1, the suspension spring unit 1 being loaded via the outer connecting elements 11 with a compressive force, indicated by way of arrows. The compressive force which is applied to the suspension spring unit 1 is equally great in each of the bodies and elements as a result of the series connection in the ring bodies 10 and in the connecting elements 11. As a result of the applied compressive loading, the ring bodies 10 are shown with a deformation, in particular the main sections 10a of the ring bodies 10 comprise a deflection 17 which is configured inward into the ring bodies 10.

A guide element 16 is shown by way of example on the left-hand side of the ring bodies 10, and the guide element 16 serves to guide the ring bodies 10 via the radius sections 10b which connect the main sections 10a to one another in an arcuate manner in the transverse direction 13. The guide element 16 therefore guides the ring bodies 10 via the radius sections 10b. The guide element 16 is configured in such a way that the radius sections 10b can slide in the guide element 16 in the spring direction 12, with the result that the guide element 16 serves only to guide the ring bodies 10 and does not exert any forces on the latter. In addition, a further guide element 16 can be provided in the same way on the right-hand side so as to lie opposite the guide element 16 which is shown. The guide element 16 is configured as a rail and prevents, in particular, lateral twisting of the individual ring bodies 10.

By way of the suspension spring unit 1 which is shown in the exemplary embodiment for the present invention, a spring unit is provided which can serve as a vehicle suspension spring and is provided from a fiber composite material with a very low weight. Here, the suspension spring unit 1 can comprise a considerably lower weight than conventional steel springs, but the suspension spring unit 1 can have the same spring characteristic and performance as a corresponding steel spring.

The implementation of the invention is not restricted to the preferred exemplary embodiment which is specified in the above text. Rather, a number of variants are conceivable which make use of the described solution, even in the case of embodiments of a fundamentally different type. All of the features and/or advantages which proceed from the claims, the description or the drawings, including structural details or spatial arrangements, can be essential to the invention both per se and in the widest variety of combinations.

What is claimed is:

1. A suspension spring unit for a vehicle chassis, the suspension spring unit being positionable between a vehicle body and a wheel support, the suspension spring unit comprising:

a first ring body having an outer circumferential surface;

a second ring body having an outer circumferential surface, each of said first ring body and said second ring body comprising a fiber composite material and having a closed contour so as to form a fiber composite spring body, wherein the second ring body is spaced apart from the first ring body; and a connecting element disposed between and affixed to said respective outer circumferential surfaces of each of said first and second ring bodies so as to couple said first ring body to said second ring body in series and on end, wherein the connecting element couples the first and second ring bodies and is disposed between the first and second ring bodies in a way that prevents any components within the first and second ring bodies from limiting spring travel of the first and second ring bodies.

2. The suspension spring unit of claim 1 wherein the connecting element is one of at least two connecting elements, wherein the at least two connecting elements are arranged diametrically opposite one another on the first and second ring bodies, wherein a spring direction runs through the at least two connecting elements.

3. The suspension spring unit of claim 2 wherein the first and second ring bodies each have an oval configuration, wherein the first and second ring bodies each have an elongate configuration in a transverse direction that runs transversely with respect to the spring direction.

4. The suspension spring unit of claim 3 wherein the closed contour of each of the first and second ring bodies comprise two substantially straight main sections that run generally parallel to one another in the transverse direction and two radius sections that connect the main sections.

5. The suspension spring unit of claim 3 wherein the transverse direction is defined by way of the oval configuration, with the transverse direction extending along an elongate axis of the first and second ring bodies.

6. The suspension spring unit of claim 3 wherein a ratio of a length of an axis in the transverse direction to a length of an axis of the first and second ring bodies that runs in the spring direction is between 2:1 to 10:1.

7. The suspension spring unit of claim 1 wherein the fiber composite material comprises fiber layers that run predominantly in a circumferential direction of the first and second ring bodies.

8. The suspension spring unit of claim 1 wherein the connecting element is one of at least two connecting elements, wherein the at least two connecting elements are arranged diametrically opposite one another on the first and second ring bodies, wherein a spring direction runs through the at least two connecting elements, the suspension spring unit further comprising a guide element that guides the first and second ring bodies and prevents buckling of the first and second ring bodies out of the spring direction.

9. The suspension spring unit of claim 1 wherein one of the first and second ring bodies comprise a circumferential cross section of flat configuration in a manner of a flat belt.

10. The suspension spring unit of claim 9 wherein the connecting element is connected to the circumferential cross section in such a way that the flat belt runs with an unchanged cross-sectional profile through a connecting point to the connecting element.

11. The suspension spring unit of claim 1 wherein the connecting element extends in a spring direction, wherein the first and second ring bodies are elongated in a direction transverse to the spring direction, with the connecting element extending further in the spring direction than in the transverse direction.

12. The suspension spring unit of claim 1 wherein the outer circumferential surfaces of the first and second ring bodies connected by the connecting element are straight main sections and are orthogonal to a longitudinal axis extending through the connecting element.

13. A suspension spring unit for a vehicle chassis, the suspension spring unit being positionable between a vehicle body and a wheel support, the suspension spring unit comprising:
   a first ring body having an outer circumferential surface;
   a second ring body having an outer circumferential surface, each of said first ring body and said second ring body comprising a fiber composite material and having a closed contour so as to form a fiber composite spring body, wherein the second ring body is spaced apart from the first ring body; and
   a connecting element disposed between said respective outer circumferential surfaces of each of said first and second ring bodies so as to couple said first ring body to said second ring body in series, wherein the connecting element is affixed directly and only to the outer circumferential surfaces of the first and second ring bodies, wherein the connecting element is affixed to the outer circumferential surfaces of the first and second ring bodies at points that coincide with a spring direction that extends through the first and second ring bodies.

14. The suspension spring unit of claim 13 wherein spaces circumscribed by the first and second ring bodies are unoccupied.

15. The suspension spring unit of claim 13 wherein the connecting element is rectangular.

16. The suspension spring unit of claim 13 wherein the spring direction runs through the at least two connecting elements along an axial centerline of the at least two connecting elements, wherein the first and second ring bodies each have an elongate configuration in a transverse direction that runs transverse to the spring direction.

17. The suspension spring unit of claim 16 wherein the closed contour of each of the first and second ring bodies comprises two substantially straight main sections that run generally parallel to one another in the transverse direction and two radius sections that connect the main sections, wherein at least a majority of each of the two radius sections connecting the main sections is curved.

18. A suspension spring unit for a vehicle chassis, the suspension spring unit being positionable between a vehicle body and a wheel support, the suspension spring unit comprising:
   a first ring body having an outer circumferential surface;
   a second ring body having an outer circumferential surface, each of said first ring body and said second ring body comprising a fiber composite material and having a closed contour so as to form a fiber composite spring body, wherein the second ring body is spaced apart from the first ring body; and
   a connecting element disposed between said respective outer circumferential surfaces of each of said first and second ring bodies so as to couple said first ring body to said second ring body in series and on end, wherein the connecting element is a singular structure that is affixed directly and only to the outer circumferential surfaces of the first and second ring bodies.

19. The suspension spring unit of claim 18 wherein the first and second ring bodies are coupled in series such that the closed contour of the first ring body compresses when the closed contour of the second ring body compresses and the closed contour of the first ring body expands when the closed contour of the second ring body expands.

20. The suspension spring unit of claim 18 wherein the connecting element is a singular structure that is affixed directly to the outer circumferential surfaces of the first and second ring bodies at an axial centerline extending through the first and second ring bodies.

* * * * *